US006851052B1

(12) United States Patent
Graveman

(10) Patent No.: US 6,851,052 B1
(45) Date of Patent: Feb. 1, 2005

(54) METHOD AND DEVICE FOR GENERATING APPROXIMATE MESSAGE AUTHENTICATION CODES

(75) Inventor: Richard F. Graveman, Morristown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 09/458,336

(22) Filed: Dec. 10, 1999

Related U.S. Application Data

(60) Provisional application No. 60/111,771, filed on Dec. 10, 1998.

(51) Int. Cl.[7] .......................... H04L 9/36; H03M 13/43
(52) U.S. Cl. ..................... 713/168; 713/181; 380/42; 714/752; 714/758
(58) Field of Search .............................. 713/168, 171, 713/181; 380/37, 42–44, 46, 262, 263; 714/752, 758, 760, 777, 771

(56) References Cited

U.S. PATENT DOCUMENTS 6,125,183 A * 9/2000 Jiawook et al. ............... 380/28
6,269,164 B1 * 7/2001 Pires ........................... 380/42

FOREIGN PATENT DOCUMENTS

EP       0 674 266 A2 * 9/1995 ........... G06F/12/02

OTHER PUBLICATIONS

Ross Anderson, Charalampos Manifavas, "Chameleon—A New Kind of Stream Cipher," Proceedings of the 4th International Workshop, FSE'97 Haifa, Israel, Jan. 1997, pp. 107–113.

* cited by examiner

Primary Examiner—Justin T. Darrow

(74) Attorney, Agent, or Firm—Joseph Giordano

(57) ABSTRACT

An approximate message authentication code (AMAC) which, like conventional message authentication codes, provides absolute authentication of the origin of the message, yet provides an approximate integrity check for the content of the message. The approximate integrity check will be computed probabilistically and will likely be the same for messages having only a small percentage of different bits. A distance measure on the AMACs, such as a Hamming distance measure, may be used to determine whether the number of bit differences between the messages is likely to be within an acceptable amount. The AMAC is a probabilistic checksum based on a shared key. The AMAC uses the message and a shared key as inputs. Optionally, an initial value may also be used as an input. In one version of the invention, the data in the message M are permuted and arranged (physically or logically) into a table having |A| bits in each column and $T^2$ rows, where T is may be an odd integer. The permuted data are masked, for example, to generate an unbiased, independent, identically distributed set of bits (1 s and 0 s). Taking T rows at a time, the majority bit value for each column is determined and that majority value is used to generate a new row. This procedure is repeated on the T new rows of majority bits. The resulting |A| bits is the AMAC.

40 Claims, 10 Drawing Sheets

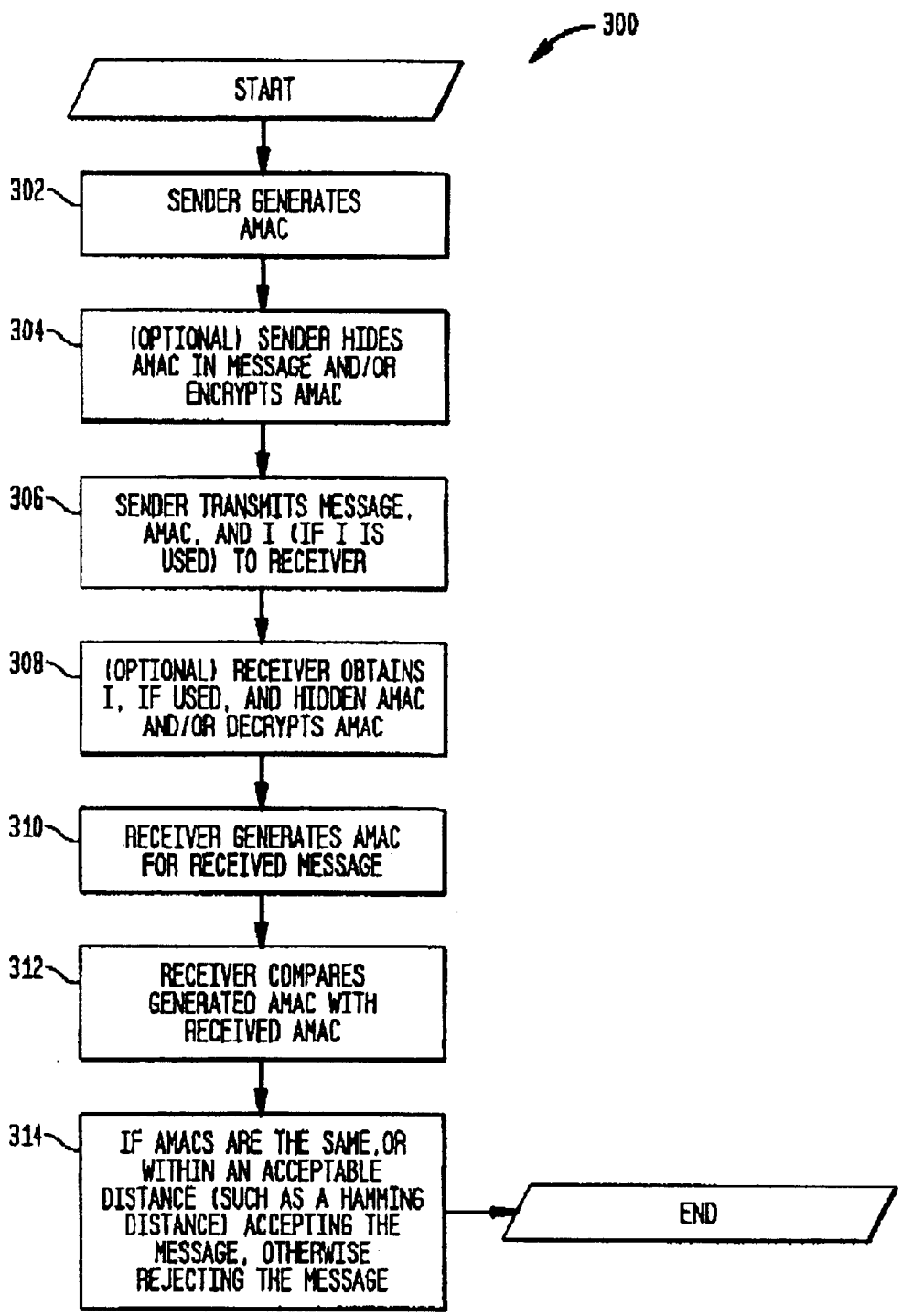

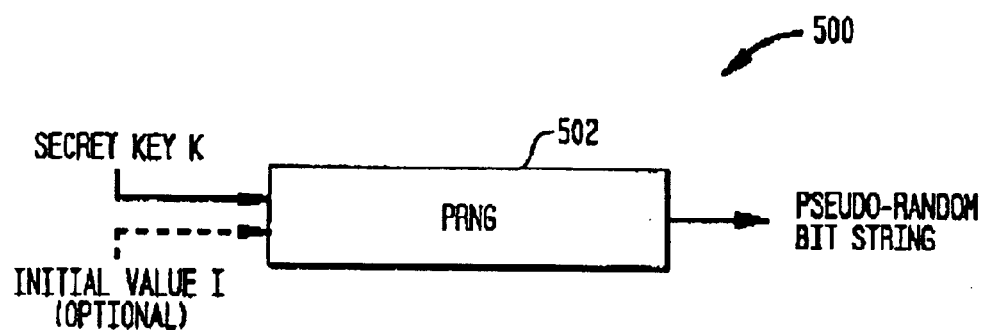
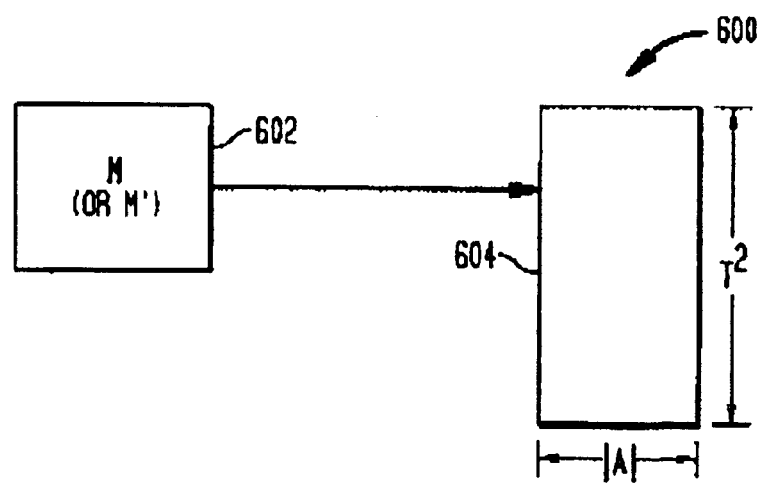

METHOD AND DEVICE FOR GENERATING APPROXIMATE MESSAGE AUTHENTICATION CODES

RELATED APPLICATION

This application claims the benefit of U.S. Provisional Patent Application Ser. No. 60/111,771 entitled "Approximate Message Authentication Codes" for Richard F. Graveman, filed on Dec. 10, 1998. The contents of this Provisional Patent Application are incorporated herein by reference.

STATEMENT OF GOVERNMENT RIGHTS

This invention was made with United States Government support under Cooperative Agreement No. DAAL01-96-2-002 awarded by the United States Army Research Laboratory. The United States Government has certain rights in the invention.

BACKGROUND OF THE INVENTION

1. Field of the Invention

The present invention relates to authenticating the source and integrity of transmitted or stored information. In particular, the present invention is a method and device for generating approximate message authentication codes (AMAC). An AMAC provides absolute authentication of the source or origin of a received message and permits verifying approximate integrity between the original message and the received message.

2. Discussion of Related Art

It is often desirable to ensure that the source or origin of a message or other communication is who it is represented as being and that the received message is the same as the original message. One well-known way to provide this type of authentication is a Message Authentication Code (MAC). A MAC is generated for an original message M and is sent with the message. This allows the recipient of a message to verify that the received message M' was actually sent from the purported sender and that the message has not been altered from the originally transmitted message M. This can be done by the message sender applying a one-way hash function (described below) on a secret key (also described below) and the message M. The result is a MAC. The recipient may receive the message M' and the MAC. If the recipient has the secret key, she can then apply the same hash function to the key and message M'. If the two MAC values are the same, the messages are identical. Because the secret key correctly computed the MAC to obtain the hash value, the message originated from the purported sender. Because the MAC values are the same, the recipient has also verified that the received message M' has not been altered from the original message M.

A hash function is a function which takes an input string of any length (often called a pre-image) and computes a fixed-length output string (often called a hash value). In the example above, the pre-image is the original message M. A one-way hash function is a hash function for which it is computationally intractable to find two pre-images with the same hash value. Briefly, a one-way function is a function that is easy to compute but hard to invert on an overwhelming fraction of its range. In a good one-way hash function, given a hash value, it is computationally infeasible to determine any pre-image that hashes to that value. Another type of hash function is a collision resistant hash function. One important feature of a collision resistant hash function is that it is computationally intractable to generate two pre-images which hash to the same hash value. In a typical collision-free, one-way hash function, a change of one bit between pre-images results in an expectation that each bit of the hash has about a 50% chance of changing. Therefore, even a single bit difference results in an entirely different hash value.

A secret key is typically a large number that is known only to certain users, thus the term "secret." "Secret key" as used here refers to a secret key in a MAC or symmetric encryption algorithm (symmetric cryptosystem). In a typical symmetric cryptosystem, the users, for example the sender and the recipient, agree on a cryptosystem and agree on the secret key. In the case of a MAC, the sender uses the same secret key to generate the MAC as the recipient uses to verify the MAC.

FIG. 1 is a block diagram of a typical cryptography device 100, such as may be used in a symmetric cryptosystem or MAC. The device 100 has a one or more processors 102 including one or more CPUs, a main memory 104, a disk memory 106, an input/output device 108, and a network interface 110. The devices 102–110 are connected to a bus 120 which transfers data, i.e., instructions and information, between each of these devices 102–110. The processor 102 may use instructions in the memories 104, 106 to perform functions on data, which data may be found in the memories 104, 106 and/or received via the I/O 108 or the network interface 110.

For example, a plain text message M may be input via the I/O 108 or received via the network interface 110. The plain text message may then be hashed using the processor 102 and key stored in some memory (such as main memory 104 or disc memory 106). The result of this hash (i.e, the MAC) may be transmitted (along with the plain text message M) to another party via the network interface 110 connected to a local area network (LAN) or wide area network (WAN). Similarly, a MAC may be received via the network interface 110 and verified using the processor 102 and key stored in some memory (such as main memory 104 or disc memory 106) and perhaps software stored in the main memory 104 or the disk memory 106.

FIG. 2 illustrates a network 200 over which cryptography devices 100 may communicate. Two or more cryptography devices 100, 100' may be connected to a communications network 202, such as a WAN which may be the Internet, a telephone network, or leased lines; or a LAN, such as an Ethernet network or a token ring network. Each cryptography device 100 may include a modem, network interface card, or other network communication device 204 to send encrypted messages and/or message authentication codes over the communications network 202. A cryptography device 100 may be a gateway to a sub-network 206. That is, the device 100 may be an interface between a wide area network 202 and a local area (sub) network 206 (or it may be an interface to a storage device, e.g., a disk controller).

In certain situations, even the slightest change in the message is unacceptable, such as in electronic payments or precise target coordinates. In such applications, the strict determination of even a one-bit change can be critical. In some applications, however, such as voice or imagery, this strict requirement is not needed and not desirable for the reasons discussed. The message may be slightly altered after the sender generates the MAC. This may happen, for example, if the message is a still image (i.e., a picture) and, after the hash value is generated, "hidden text" is added to the image. Hidden text may be a "digital watermark" or "fingerprint" added to an image to identify the origin of the image. A content provider may include hidden data on an image it posts on the Internet. The hidden data may be used as evidence of ownership and copying if another party misappropriates the image. Although the hidden data involves no illicit "tampering" that should cause the recipient to reject the image, some of the information has been changed. This change causes the hash value of the received message M' (which contains the hidden data) to be entirely different from the hash value of the original message M (which does not contain the hidden data). This leads the recipient to conclude that the received message M' has been forged or altered and is unreliable. The same problem arises for images and voice if noise is introduced into the message during transmission.

"Lossy compression" is another application where information may be lost or altered in a way that should be acceptable. For example, a still image (a picture) may be compressed using a lossy compression technique such as JPEG after the MAC is generated. JPEG is a data compression technique that eliminates redundant information from a still image. As a result, some of the information in the original image (message M) may be lost when it is compressed and later decompressed. Nevertheless, the changes in the received message (decompressed image M') are not illicit tampering, nor is the image a forgery. Therefore, this compressed-decompressed image M' should have sufficient integrity to be accepted. However, because there has been some change in the data, a MAC using a hash function will show that the integrity of the image has been compromised, and the image will be rejected.

There is a need to provide a message authentication code that permits absolute authentication (i.e., the sender is the party identified as the purported sender) and approximate integrity (i.e., the message has undergone no more than some acceptable amount of modification). For example, the recipient should be able to determine that the differences between the original message M and the received message M' are only slight. This permits some integrity loss due to hidden data, noise, some instances of lossy compression, or other change, but prevents all out forgeries, substantial changes in content, or "cut-and-paste" attacks.

Therefore, it is an object of the present invention to provide a method and device for generating an approximate message authentication code which provides absolute authentication and approximate integrity.

It is another object of the present invention to provide a method and device which permits a recipient to accept certain messages as authentic and sufficiently unaltered, even if there is a slight change in the message.

SUMMARY OF THE INVENTION

These and other objects of the present invention are provided by an approximate message authentication code (AMAC) which, like conventional message authentication codes, provides absolute authentication of the origin of the message, yet provides an approximate integrity check for the content of the message. The approximate integrity check is computed probabilistically and will likely be the same for messages having only a small percentage of different bits. A distance measure on the AMACs, such as a Hamming distance measure, may be used to measure whether the number of bit differences between the messages is within a predetermined acceptable amount.

The AMAC is a probabilistic checksum based on a shared key. The AMAC uses the message and a shared key as inputs. Optionally, an initial randomizing value may also be used as an input, as well. In a preferred embodiment, the data in the message M are permuted and arranged (physically or logically) into a table having $|A|$ bits (the number of bits of the desired AMAC) in each column and $T^2$ rows, where T is preferably an odd integer. The permuted data are masked, for example, by exclusive-ORing with pseudo-random bits, to generate an unbiased, independent, identically distributed set of bits. Taking T rows at a time, the majority bit value for each column is determined and that majority value is used to generate a new row. This majority calculation repeated on the columns of the T new rows of majority bits. The resulting $|A|$ bits is the AMAC.

The recipient receives a message M' and an AMAC for the original message M from a purported sender. The recipient uses the key it shares with the purported sender (and perhaps an initial value) to generate an AMAC for the received message M'. If the key is different from the one used to generate the original AMAC, the AMAC generated by the recipient will be entirely different from the AMAC from the sender and the message will be rejected because the sender is an imposter. If the AMAC values are the same, (1) the sender is who he purports to be and (2) the bit differences between the original message M and received message M' are within an acceptable threshold. An even greater threshold of bit differences may be acceptable and a measure, such as a Hamming distance measure, may be used to determine if the number of bit differences between AMACs is acceptable, such as whether the number of bit differences do not exceed a predetermined expected number of bit differences between the messages.

The acceptable number of bit differences between messages may be represented by the number of bit differences between the AMAC for the original M and the AMAC for the received message M'.

BRIEF DESCRIPTION OF THE DRAWINGS

The present invention is described with reference to the following figures:

FIG. 3 is a flowchart of an overview of the method according to the present invention;

FIG. 5 is a block diagram illustrating a pseudo-random bit-string generator module;

FIG. 6 is a block diagram illustrating an arrangement module of the invention which arranges the message M (or M') into a table of dimension $|A|$ by $T^2$;

DETAILED DESCRIPTION OF PREFERRED EMBODIMENTS

Overview of the Invention

Figure 1:
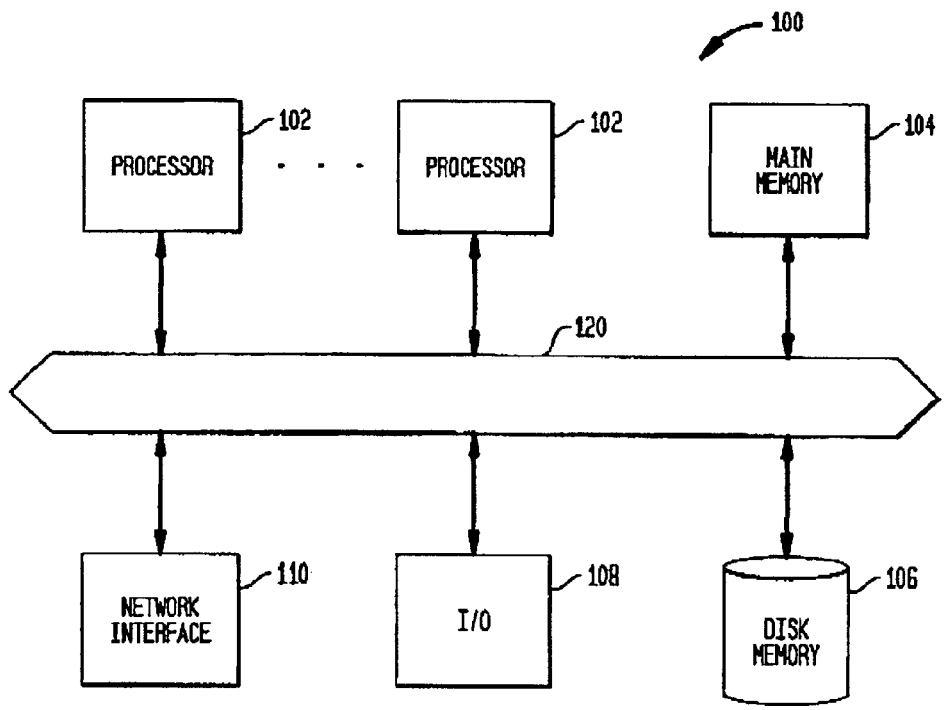
FIG. 1 is a block diagram of a typical cryptography device.

FIG. 3 is a flowchart 300 of an overview of the method according to the present invention. A sender generates an Approximate Message Authentication Code (AMAC) for a message M where approximate integrity is acceptable (step 302). Some examples of messages where approximate integrity may be acceptable include a still or moving image or voice. A person skilled in the art readily recognizes that many types of messages may fall within this category. The AMAC may be generated using a shared (or secret) key shared with the intended recipient and, optionally, an initial value I. Optionally, the sender may hide the AMAC in the message M, using for example, steganographic techniques; the AMAC may be encrypted; or the AMAC and message may be combined (for example, possibilities include concatenation or steganographic techniques) and the combination encrypted (step 304). These steps may be performed by a cryptography device 100 (as seen in FIG. 1), special purpose processor, or computer.

Figure 2:
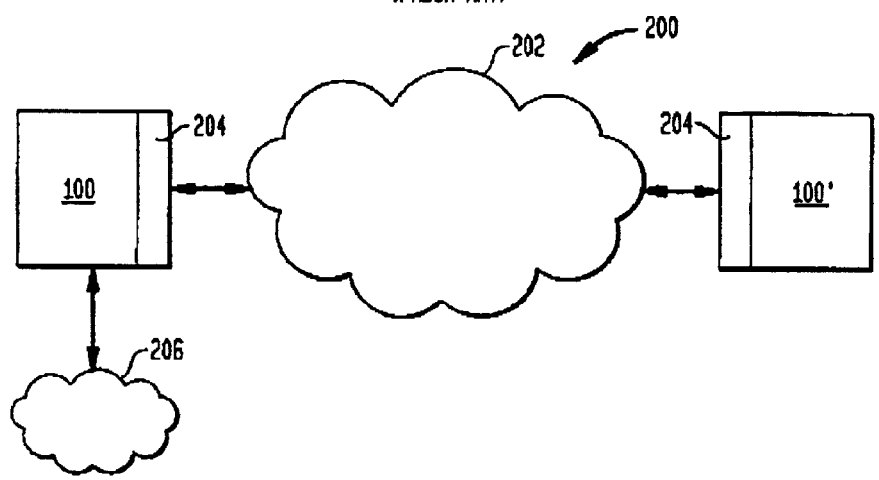
FIG. 2 is a simplified diagram illustrating a network over which cryptography devices may communicate.

The sender may then transmit the message M, AMAC, and, if used, an initial value I (described below) (step 306). This transmission may be made via the network communication device 204 (seen in FIG. 2) over a local area network (LAN), wide area network (WAN) such as the Internet, or other transmission or storage medium. The transmission of the message and the AMAC may be over a noisy channel. If an initial value I is used, it should be transmitted over a reliable channel, such as in an out-of-band channel or using an error correction code. The transmission of step 306 may also be made to a storage medium, such as main memory 104 or disk memory 106 (seen in FIG. 1) for later retrieval or other use.

The recipient receives (or retrieves) the message, AMAC, and (if used) the initial value I and obtains the message M' and the AMAC (step 308) by parsing the data, decrypting the AMAC and/or the message M' or other appropriate method. The recipient then generates another AMAC (step 310) using the message M' the shared key, and initial value I, if used. Because the security of the AMAC depends on the key and I (if used), the AMAC is computed probabilistically, and a change in the message may or may not change the AMAC, depending on the key and I. The AMAC generated from the received message M' is compared with the AMAC of the original message M (step 312). If the messages M, M' are the same, or if only a small percentage of bits are different (for example, if 0.005% to 0.01% bits are different) they may have the same AMAC value and the received message M' is accepted as having sufficient integrity. (Also, because the AMAC is similar, the shared key K and, if used, I were correct and therefore the sender is authenticated as who he purports to be.) If the messages M, M' have a greater percentage of different bits, a distance measure (such as a Hamming distance) may be used to determine whether or not the messages may be considered "close enough" for the particular application. For example, for some application, it may be acceptable to have a difference in the messages M, M' of as many as one different bit per 5000 (i.e., 0.02%). This percent difference is likely to result in a small Hamming distance between AMACs. Differences between messages M, M' having a distance measure equal to or less than that amount will permit the received message M' to be accepted with high probability and having a distance measure greater than that amount will result in message M' being rejected with high probability (step 314).

Generating An Approximate Message Authentication Code

Figure 4A:
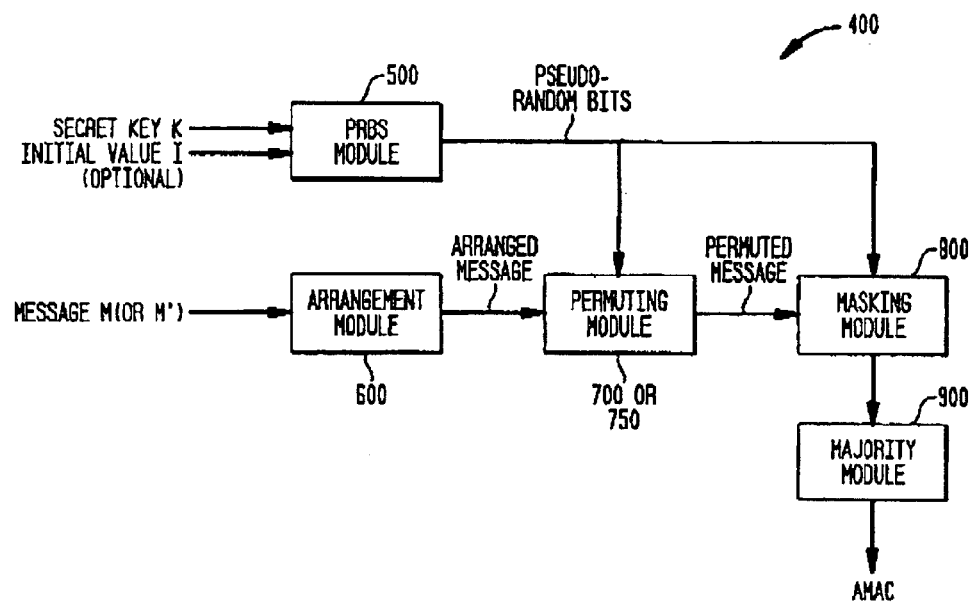
FIG. 4A is a block diagram of an AMAC generation device according to the present invention.

FIG. 4A is a block diagram of a preferred embodiment of an AMAC generation device 400 according to the present invention. This AMAC generation device may be implemented, for example, in a cryptography device 100 such as is seen in FIG. 1, in a special purpose computer, an application specific integrated circuit (ASIC), or software running on a conventional computer. As seen in FIG. 4A, a secret (or shared) key K and, optionally, an initial value I are input into a pseudo-random bit string (PRBS) generator module 500. The PRBS generator module 500 outputs a pseudo-random bit string. The message M (or M') is input into an arrangement module 600, which outputs the message arranged a particular way. The arranged message and random bits from the PRBS are input into a permuting module 700 or 750, which permutes data in the arranged message. The permuted data are input into a masking module 800 which masks the permuted data. The masked data are sent to a majority module 900, which copies the masked data into certain arrays (called S-arrays) and determines the majority bit value in each column of each array. The majority bit values of each S-array are placed in another array (called a T-array). The majority module determines the majority bit value in each column of the T-array. The result of this second process is the AMAC.

Figure 4B:
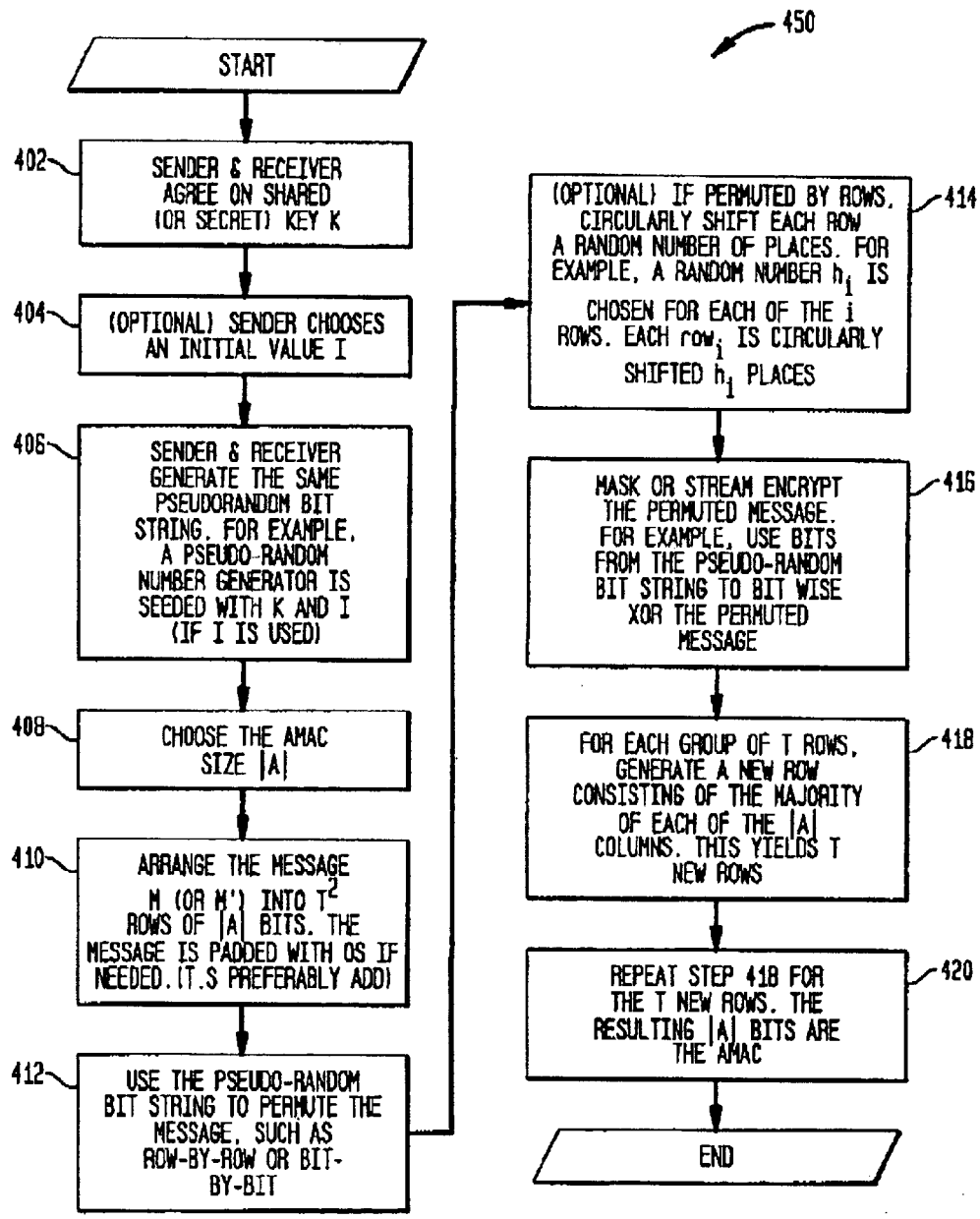
FIG. 4B is a flowchart describing a method for generating an AMAC.

FIG. 4B is a flowchart 450 describing the method for generating an AMAC. The sender and receiver agree on a shared or secret key K (step 402). The shared key K may be, for example, computed using a Diffie-Hellman key exchange, but any conventional method of choosing a shared key may be used. For example, the sender and the recipient may authenticate each other, generate the shared key K, use the key, and discard it. This permits only "on-line" attacks. The length of key K is not important to the invention, but the key is preferably long enough to prevent it from being guessed by trying all possible keys. A 96 bit key is satisfactory for current technology, but in the future, longer keys may be desirable.

Both the sender and the recipient also have the same pseudo-random bit string generator module 500, and which preferably includes a cryptographically strong pseudo-random number generator (CSPRNG). Any standard, off-the-shelf PRNG or CSPRNG may be used. The (CS)PRNG may be software running on a processor, such as processor 102 seen in FIG. 1. For example, the CSPRNG may be the key stream generator for a stream cipher, such as RC4 (owned by RSA Data Security, Inc, Redwood City, Calif.) or VRA (owned by Telcordia Technologies). Note that the same input into these two (CS)PRNGs will result in the same output. The output of the (CS)PRNG is a pseudo-random bit string (PRBS). This will be used to generate approximately as many bits as the total size of the message being authenticated.

Optionally, an initial value (or initial vector) I is chosen (step 404). The initial value I need not be kept secret. For a given key K and message M, the sender can produce a family of AMACs parameterized by the initial value I. I may be arbitrarily chosen and is preferably the output of an incremental counter or a clock. Varying the initial value makes attacks on the AMAC more difficult and permits many uses of the shared key K. Each initial value I defines different neighborhoods, i.e., defines a different partition of messages into ones with the same AMAC. The selected I and the shared key K affect the calculation of the AMAC probabilistically.

The sender and receiver generate the same pseudo-random bit string (step 406). As seen in FIG. 5, a pseudo-random bit string generator module 500 may be used by both the sender and receiver by seeding the (CS)PRNG 502 with shared key K and, if used, initial value I. Because the identical inputs are used in the same (CS)PRNG, the pseudo-random bit strings that are output will be identical. Note that the sender and receiver can perform this step in advance once they both have K (and I if used). Each could generate the pseudo-random bit string (PRBS) at any time before or during the generation of their respective AMACs.

Returning to FIG. 4B, the size of the AMAC |A| is chosen (step 408). The size of the AMAC |A| is the number of bits long the AMAC will be. As discussed below, the selection of |A| affects the AMAC's sensitivity to bit differences. The AMAC should be long enough to make it prohibitively unlikely that an attacker can guess an acceptable value for a forged message, so it will typically be at least 100 bits long. The upper bound for the length of the AMAC is dictated by convenience, so that |A| is usually chosen to be 100 to 300 bits. Once the AMAC size |A| is selected, the message M (or M', since the same process is performed on both the original and the received message) is arranged into $T^2$ rows, each row being |A| bits long. T is preferably an odd number (for reasons discussed below). If the message does not have enough data to fill $T^2$ rows, additional rows are created by padding with 0 s.

As seen in FIG. 6, an arrangement module 600 arranges the message M (or M') 602 into a table 604 of size |A| by $T^2$. This may be done physically, by storing the bits (or bytes) of the message in a table of these dimensions (such as in the main memory 104 shown in FIG. 1) or logically by treating the bits (or bytes) of the message as if they were stored in such a table. This process may be performed by a processor 102, as seen in FIG. 1 or other device or software. As discussed below, the arrangement module 600 may arrange less than all of the data in the message. If less than all of the data are arranged, T is selected to be an appropriate number for the amount of data arranged.

Figure 7A:
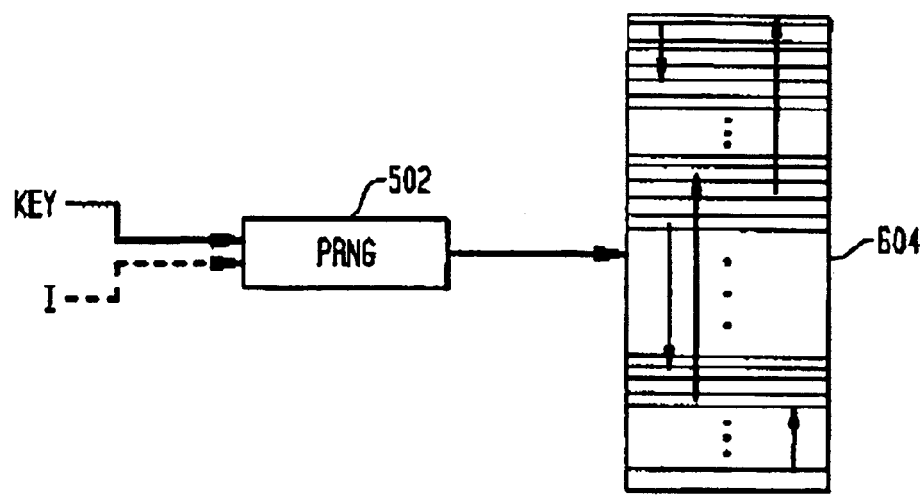
FIG. 7A is a block diagram illustrating a first embodiment of a permuting module of the invention which permutes the message M (or M') by row.
Figure 7B:
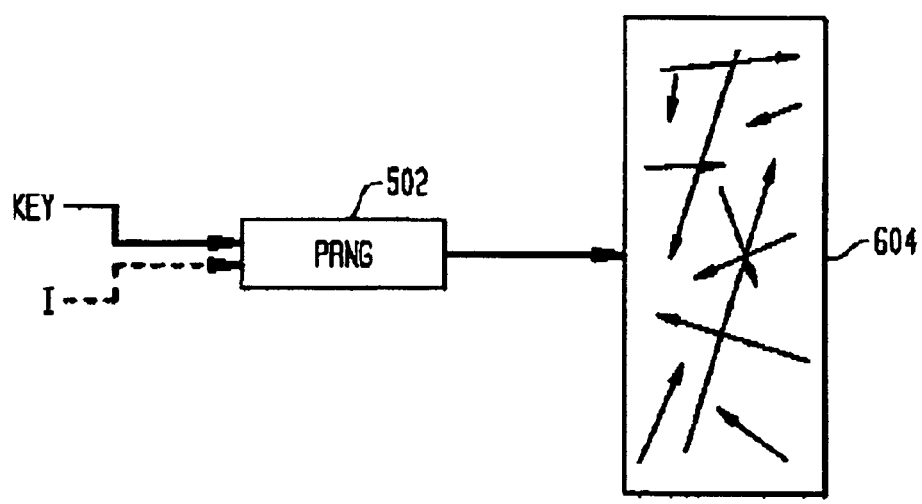
FIG. 7B is a block diagram illustrating a second embodiment of a permuting module of the invention which permutes the message M (or M') by bit.

Returning to FIG. 4B, the message, now arranged (physically or logically) into a table of size |A| by $T^2$, is permuted, using the pseudo-random bit string (step 412). This is done so that an attacker cannot predict which bits of the message will affect each columnar majority calculation (discussed below). As seen in FIG. 7A, which is a first embodiment of a permuting module 700, the PRBS (which may have been generated previously by the (CS)PRNG 502) is used to permute the message in the table 604 by row. As seen in FIG. 7B, a second embodiment of the permuting module 750, the PRBS is used to permute the message by bit. The bit positions in a byte or data word in which certain small differences occur may or may not provide information about the differences between the two messages. It is preferable to permute the message by row if it is desirable to retain the value of most significant bits in a byte or data word. This may be important if, for example, a lossy compression technique such as JPEG is used. In JPEG, it is more likely that the differences will be in the least significant bits of the byte or data word. If the message is permuted by bit, the significance of the positions of the bits in a byte or word is lost in the AMAC. It is also contemplated that the message may be permuted by byte or by data word.

The permutation may be performed in the following manner. An unpredictable permutation is selected and used. For example, a family of permutations, such as, a block cipher such as DES (public domain), IDEA (owned by Ascom-Tech AG, Mägenwil, Switzerland), RC5 (owned by RSA, Redwood City, Calif.), or conventional MAC may be used. When, for example, 0 is input, the random location of row (or bit) zero is output; when 1 is input, the random location of row (or bit) 1 is output. These block ciphers are collision free, so that different inputs will not result in the same output. If the set of N objects (i.e., bits, bytes, words, or rows) to be permuted is numbered $0_1, 0_2, \ldots 0_N$, then a pseudo random key is chosen from the PRBS (or output from the CSPRNG 502). Then the values $1, 2, \ldots, N$ are encrypted using any conventional encryption function, and the table of values $1, 2, \ldots, N$ and their encryptions is sorted according to the encrypted values. The new position of the value 1 and its encryption in the sorted table is the position to which $0_1$, is moved by the permutation, and so on for $0_2$, and up through $0_n$. The encryption function used should produce at least N values. If the number of possible values of the encryption function is exactly N, this calculation is extremely efficient. Note that it is not important to the invention if the message is permuted before, after, or at the same time as it is divided into the |A| by $T^2$ table.

Alternatively, all or less than all of the data of the message may be permuted. There are several ways to permute less than all of the data in the message. One way to achieve this is to use a pseudo-random function (such as f(i)=encrypt(i) mod $T^2$) instead of a permutation. This pseudo-random function be used to select fewer than all of the bits (or other data), or use certain bits more than once, to generate the AMAC. The pseudo-random function may receive as input part of the PRBS to determine which bits are selected to generate the AMAC. A second way to achieve this is to generate the AMAC using a sample of the message M (and M'). The message may be sampled using any suitable sampling technique. A third way to achieve this is to use data in the message to generate statistics or averages of the message, and using these statistics or averages to generate the AMAC. Image data, for example, may use either sub-block averages or edge detection values. These averages and/or values are the data from the message that are used to generate the AMAC.

If the above permutation was applied to the TV rows (as opposed to bits, bytes, or words), then the following optional step may be performed. Returning to FIG. 4B, optionally, the bits in each row may be permuted within that row. One way to do this is to obtain a random number $h_i$ for each row i, from the PRBS (or the PRNG). Preferably, the random number is at least $\log_2 |A|$ bits long. This random number $h_i$ may be used to shift the bits in row i of the table 604 h bits to the left circularly. For example, if $h_i$ is 0101100 (binary for decimal number 44), each bit in row i of the table is shifted 44 places to the left circularly (step 414). That is, the bit in the 45th column is shifted 44 times to be located in the first column; the bit in the first column is shifted 44 times to be located 44 columns from the end of row i. If the shift is a multiple of 8 (i.e., the size of a byte), then the low order bits are still aligned, as described above.

Figure 8:
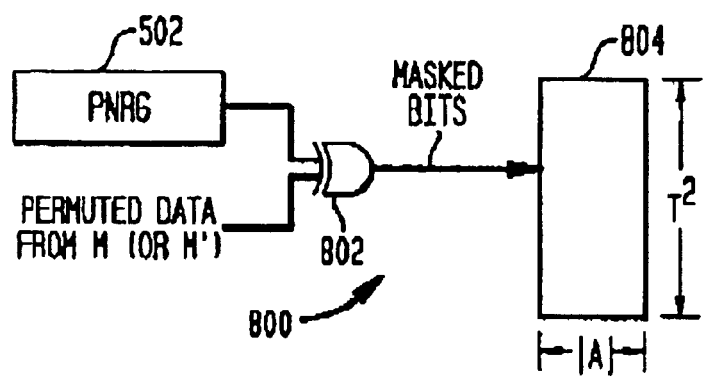
FIG. 8 is a block diagram illustrating a masking module of the invention which masks or stream encrypts the permuted message.

The permuted data in the table 604 are masked or stream encrypted (step 416). As seen in FIG. 8, this may be done using a masking module 800 according to the present invention. The masking module preferably includes an exclusive-OR circuit 802 which receives the permuted data from the message M (or M') and the PRBS. This step generates an unbiased, independent, identically distributed set of bits (1 s and 0 s). The masked data are stored in a table 804.

Returning to FIG. 4B, table 804, having the $|A| \times T^2$ table of the masked, permuted data, is copied T rows at a time into a $|A| \times T$ bit table called the S-array. A new row is calculated from the S-array. This new row consists of the majority value of each of the $|A|$ columns. (In order to prevent a "tie," it is preferable to select T to be an odd number, as described above. This ensures that there will be a majority bit value. If T is an even number, a row of pseudorandom bits from the PRBS is padded as a last row to the S-array.) This is repeated T times until all $T^2$ rows are used and T new rows are computed.

Figure 9:
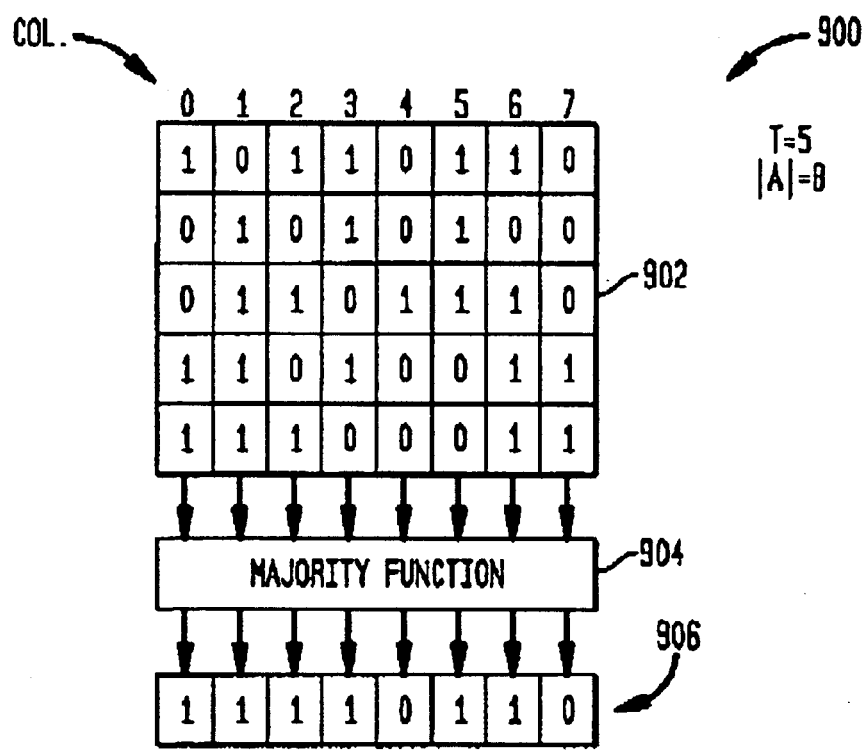
FIG. 9 is a block diagram showing sample values of a simplified majority module which determines the majority bit value for the columns of an array.

FIG. 9 is an illustrative example of a simplified (small) majority module 900, where in this example $|A|$ is 8 and T is 5. An S-array 902 thus has eight columns and five rows. Column 0 contains three 1 s and two 0 s, so the majority bit value is 1. Thus, a majority function 902 places a 1 in column 0 of the new row 906. Column 1 contains four 1 s and one 0, so the majority bit value is 1, and the majority function 904 places a 1 in column 1 of the new row 904. The majority function determines the majority of each of the other columns and places the appropriate value in the columns of new row 906. Of course, the minority of the row, or another function suitable to determine the value of the bits and number of bits having these values, are equivalent and may also be used. Also, in the preferred embodiment, the size of table 604 is selected to be $T^2$. This permits the rows of the S-array to be selected in groups of T and yield T new rows. The invention works with unequal sized sets of rows, but results in the values from S-arrays having fewer rows will weight the data contained in that array greater than the weight of the data in the S-arrays having more rows. Nevertheless, choosing unequal sets of rows is contemplated by the invention.

Returning again to FIG. 4B, step 418 is repeated for the T new rows. That is, each new row from each instance of the S-array is used to create a new table called the T-array. The majority or another suitable function of each column of the T-array is determined in the same manner to create a new row of bit values for the T-array. The resulting new row of $|A|$ bits (such as row 906 in FIG. 9) is the AMAC (step 420). If the AMAC is generated for the original message M, it may be combined with the message and transmitted to the recipient, as discussed above. If the AMAC is generated for a received message M', it may be compared to the AMAC received with the message. This comparison may involve determining the distance (such as the Hamming distance) between the AMAC for the original message M and the AMAC for the received message M'. This comparison is described in more detail below.

When generating the AMAC for the received message M', a change in the majority from the original message M will only occur if sufficient bit changes occur to change the majority. Referring to FIG. 9, in column 0, if a single change resulted in a change from a 1 to a 0, the majority will change from 1 to 0. If, on the other hand, a single bit changed from a 0 to a 1, no change in the majority will result, because 1 remains the majority bit value. In a real-world application, the value of T is likely to be much larger than 5 (a one megabyte image contains 1024×1024×8 bits and $|A|$ may be 128 and T may be 257). On average, it will take a large number of bit changes to change the majority of any column in one of the S-arrays 902. Said another way, a single bit change will have a small probability of changing the majority. Because this majority process is repeated for the T-array, on average, it will take a significant number of bit changes in a column to result in a change in the final AMAC value. As a result, the AMAC tolerates a certain percentage of bit differences between messages M and M' before the changes cause a different AMAC value. The AMAC, while providing approximate integrity, still provides absolute authenticity. If a single bit of the shared key (or initial value I, if used) is incorrect, the effect on the AMAC is the same as that on a MAC. That is, it will result in about a 50% probability for each bit to be different. This is the case because the same is true for the output of the (CS)PRNG. Thus, a one-bit difference in the key or I input into the (CS)PRNG will result in a significantly different pseudorandom bit string. Therefore, the AMAC provides absolute authentication of the origin of the message—if the sender or receiver is an imposter or otherwise does not have the same shared key or pseudo-random bit string, the result is likely to be substantially different and should be rejected. The AMAC alerts the recipient that message M' may have slight changes, for example, due to hidden data inserted after generation of the original AMAC. The longer the AMAC (i.e, the value of $|A|$), the fewer rows will be in the table 604. This will result in an AMAC that is more sensitive to bit differences than a shorter AMAC having more rows.

Determining Whether or Not the Received Message Has Sufficient Integrity

If the information channel over which M is being transmitted is known, it is possible to determine the expected number of bits by which the AMACs will differ. The expected error rate of the transmission over the transmission medium (or storage medium) may be known or approximated. It may be known, for example, that the noise level over a particular channel (or the number of data changes due to hidden data or lossy compression) is likely to result a 0.01% change in the transmitted bits. In a 1 megabyte message, if a channel is expected to change one bit out of every $10^3$ to $10^4$ bits (i.e., between 0.01% and 0.1% error rate) there will be approximately between $2^{10}$ and $2^{13}$ changed bits in the message.

An example is given where $|A|$ is 128 and T is 256 (note, here T is even, so it is preferable to pad a last row of the S-arrays and the T-array with pseudo-random bits to make the table have an odd number of rows). The expected Hamming weight for (M e M) (where e indicates bit-wise exclusive-OR) is estimated for the following expected number of bit changes between the messages M and M': $2^{10}$, $2^{11}$, $2^{12}$, $2^{13}$.

Figure 10A:
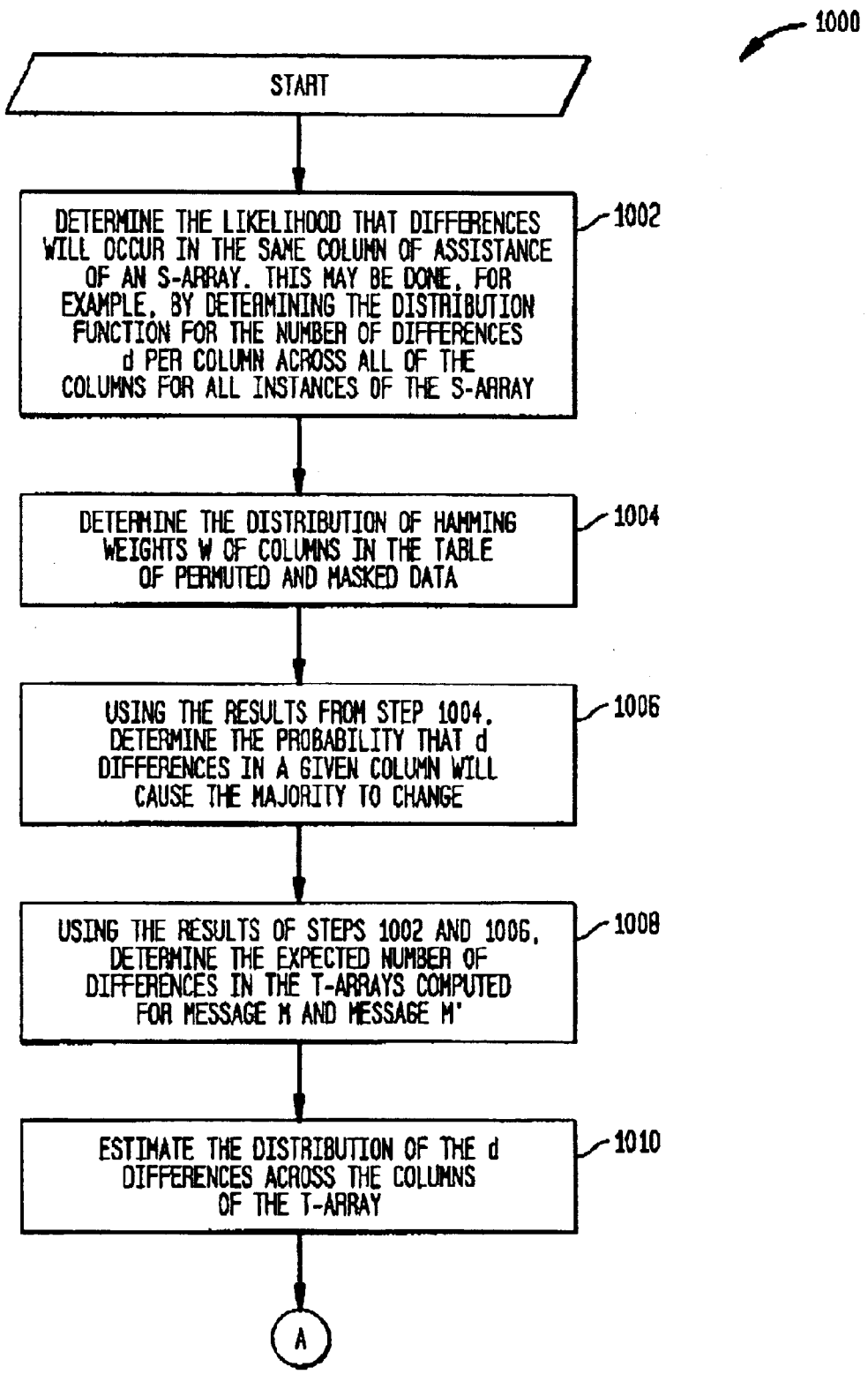
FIGS. 10A and 10B are a flowchart illustrating the method for calculating the expected differences in the AMACs, given a certain Hamming distance between message M and message M'.
Figure 10B:
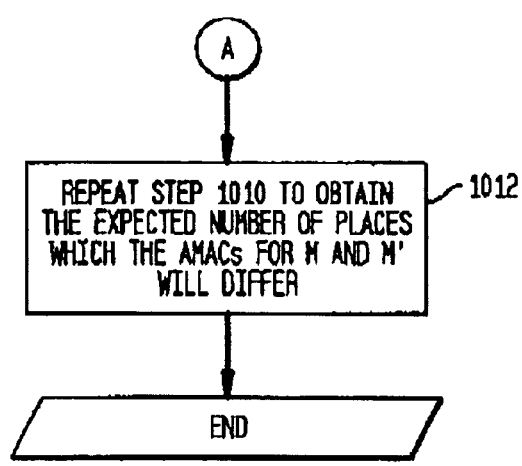

FIGS. 10A and 10B are a flowchart 1000 illustrating a method for determining the expected Hamming distances between original message M and received message M' (i.e., converting an expected number of bit differences between messages M and M' into an expected number of bit differences between the AMACs for messages M and M'). This allows the receiver to determine whether or not the differences between AMAC values are within an acceptable range. This determination may be performed in a cryptography device 100 such as is seen in FIG. 1.

First, determine the likelihood that differences will occur in the same column of an instance of the S-array (step 1002). This may be done, for example, by determining the distribution function for the number of bit differences d per column across all of the columns in each S-array (table of $|A|$ columns and T rows). This may be done, for example, by using the hyper-geometric distribution.

The following table sets out the number of expected bit differences per column (d) for each of the expected total bit difference values above:

TABLE 1

Fraction of columns with d differences

| | Hamming Distance Between 1 Megabyte Files | | | |
|---|---|---|---|---|
| d | 1024 ($2^{10}$) | 2048 ($2^{11}$) | 4096 ($2^{12}$) | 8192 ($2^{13}$) |
| 0 | 0.969231 | 0.939406 | 0.882470 | 0.778706 |
| 1 | 0.030292 | 0.058727 | 0.110363 | 0.194867 |
| 2 | 0.000472 | 0.001828 | 0.006874 | 0.024287 |
| 3 | 0.000005 | 0.000038 | 0.000284 | 0.002010 |
| 4 | | 0.000001 | 0.000009 | 0.000124 |
| 5 | | | | 0.000006 |

Second, determine the distribution of Hamming weights w of columns in the S-arrays (or T-array) (step 1004). These S-arrays include data that have been permuted and masked or stream encrypted and therefore the arrays contain balanced, independent, identically distributed bits. This determination is the binomial distribution with n=T and p=0.5. Stated differently, it is the probability of getting w heads in T coin tosses. If, for example, T=257 and d=1 in the table above, for a one-bit change to have any chance to change the majority then w=128 or w=129. The binomial distribution indicates that either of these cases has probability just under 5%.

The following table sets out the probability of Hamming weight w (or 257-w) for probability p 0.5 for the example described above.

TABLE 2

Probability of Hamming weight w or 257-w for 257 Bernoulli trials, p = 0.5.

| w | 257-w | |
|---|---|---|
| 129 | 128 | 0.049626 |
| 130 | 127 | 0.048863 |
| 131 | 126 | 0.047371 |
| 132 | 125 | 0.045217 |
| 133 | 124 | 0.042498 |
| 134 | 123 | 0.039326 |
| 135 | 122 | 0.035830 |
| 136 | 121 | 0.032142 |
| 137 | 120 | 0.028388 |
| 138 | 119 | 0.024685 |
| 139 | 118 | 0.021134 |
| 140 | 117 | 0.017813 |
| 141 | 116 | 0.014718 |
| 142 | 115 | 0.012074 |
| 143 | 114 | 0.009710 |
| 144 | 113 | 0.007687 |
| 145 | 112 | 0.005991 |
| 146 | 111 | 0.004596 |
| 147 | 110 | 0.003470 |
| 148 | 109 | 0.002579 |
| 149 | 108 | 0.001888 |
| 150 | 107 | 0.001358 |

Third, using the results from step 1004, determine the probability that d differences in a given column in an S-array or the T-array will cause the majority to change (step 1006). This may be determined by determining all cases that can possibly change the majority bit value. For example, if three bit changes occur in a column, to have any possibility of affecting the majority, the total number of bits in the column of original message M S-array (or T-array) having the minority bit value has to be within five of the total number of bits in that column having the majority bit value. Also, at least two of these three bits have to have changed from the majority value to the minority value. Changes from the minority value to the majority will not change the majority, nor will a combination of offsetting differences.

The following table sets out the probability p that a d-bit difference will change the majority of a row of 257 balanced, independent, identically distributed bits for the example described above.

TABLE 3

Probability p of a d-bit difference changing the MAJORITY of 257 balanced i.i.d. bits.

| d | p |
|---|---|
| 1 | 0.0498191 |
| 2 | 0.0500127 |
| 3 | 0.0751117 |
| 4 | 0.0753957 |
| 5 | 0.0943590 |
| 6 | 0.0947080 |
| 7 | 0.1106218 |
| 8 | 0.1110220 |
| 9 | 0.1250401 |
| 10 | 0.1254821 |
| 11 | 0.1381793 |
| 12 | 0.1386563 |
| 13 | 0.1503662 |
| 14 | 0.1508134 |
| 15 | 0.1618091 |
| 16 | 0.1623409 |
| 17 | 0.1726495 |
| 18 | 0.1732027 |
| 19 | 0.1829885 |
| 20 | 0.1835597 |

Fourth, using the results of steps 1002 and 1006, determine the expected number of differences in the T-array by determining the expected number of differences in the S-arrays for original message M and for received message M' (step 1008). This may be done by multiplying. For example, if 0.030292 of the columns are expected to have a 1-bit difference, and a 1-bit difference has a 0.0498191 chance of changing the majority of the column, and there are 128 columns, the result is 0.19316. Repeat for d=2, 3, . . . bit differences per column and add them up. That gives 0.19623. In this example, there are 256 S-arrays, so multiply and get 50.236. These expected differences in the S-arrays are used to determine the expected differences in the T-arrays.

The following table sets out the expected number of differences d in the T-array for the example above.

TABLE 4

Expected number of differences d in the T-array (256 × S).

| | Original Hamming Distance | | | |
|---|---|---|---|---|
| d | 1024 | 2048 | 4096 | 8192 |
| 1 | 0.19316 | 0.37449 | 0.70378 | 1.24264 |
| 2 | 0.00302 | 0.01170 | 0.04401 | 0.15547 |
| 3 | 0.00005 | 0.00037 | 0.00273 | 0.01933 |
| 4 | | 0.00001 | 0.00009 | 0.00120 |
| 5 | | | | 0.00007 |
| S-Total | 0.19623 | 0.38657 | 0.75059 | 1.41870 |
| T-Total | 50.236 | 98.962 | 192.151 | 363.188 |

Fifth, these d expected differences in the T-array are distributed across the columns of the T-array (step 1010).

This may be easily estimated using Bose-Einstein occupancy statistics. Note that if M and M' were padded with zeroes or pseudo-random bits on each side, the "padding" never contributes to differences, because exactly the same values are padded by the sender and the receiver. Note that this step is only an approximation, because the expected value is used instead of the complete distribution function.

The following table sets out the probability of d differences in the T-array for original message M and received message M' for the example described above.

TABLE 5

Probability of d differences in a column between M and M' T-arrays.

Original Hamming Distance/Expected T-Array Hamming Distance between M and M'

| d | 1024/50 | 2048/99 | 4096/192 | 8192/363 |
|---|---------|---------|----------|----------|
| 0 | 0.717514 | 0.561947 | 0.398119 | 0.259184 |
| 1 | 0.020384 | 0.247257 | 0.240374 | 0.192400 |
| 2 | 0.057075 | 0.108175 | 0.144831 | 0.142723 |
| 3 | 0.015745 | 0.047054 | 0.087082 | 0.105797 |
| 4 | 0.004277 | 0.020348 | 0.052249 | 0.078368 |
| 5 | 0.001144 | 0.008747 | 0.031283 | 0.005801 |
| 6 | 0.000301 | 0.003737 | 0.018690 | 0.042907 |
| 7 | 0.000078 | 0.001587 | 0.011142 | 0.031714 |
| 8 | 0.000020 | 0.000670 | 0.006629 | 0.023424 |
| 9 | 0.000005 | 0.000281 | 0.003934 | 0.017288 |
| 10 | 0.000001 | 0.000117 | 0.002330 | 0.012750 |
| 11 |  | 0.000048 | 0.001377 | 0.009396 |
| 12 |  | 0.000020 | 0.000812 | 0.006919 |
| 13 |  |  | 0.000477 | 0.005091 |
| 14 |  |  | 0.000280 | 0.003744 |
| 15 |  |  | 0.000164 | 0.002751 |
| 16 |  |  | 0.000096 | 0.002019 |
| 17 |  |  |  | 0.001482 |
| 18 |  |  |  | 0.001086 |
| 19 |  |  |  | 0.000795 |
| 20 |  |  |  | 0.000582 |

Sixth, repeat step 1010 to estimate the expected number of bits in which the AMAC for M and the AMAC for M' differ (step 1012). This may be determined by multiplying each element in Table 5 by the probability that the given number of bit differences in a column will change the majority (Table 3). Then multiply each entry by the number of columns (in this example, 128). The sum estimates the expected number of bits in which the AMAC for M and M' will differ, given the number of bits in the message that differ between them.

The following table sets out the expected Hamming weight of (M⊕M') for the example described above.

TABLE 6

Expected Hamming Weight of $M_\oplus$ M'.

Original Hamming Distance/Expected T-Array Distance

| d | 1024/50 | 2048/99 | 4096/192 | 8192/363 |
|---|---------|---------|----------|----------|
| 1 | 1.299851 | 1.576717 | 1.532826 | 1.226906 |
| 2 | 0.365365 | 0.692480 | 0.927134 | 0.913641 |
| 3 | 0.151375 | 0.452387 | 0.837231 | 1.017161 |
| 4 | 0.041281 | 0.196367 | 0.504238 | 0.756302 |
| 5 | 0.013817 | 0.105642 | 0.377833 | 0.700623 |
| 6 | 0.003649 | 0.045305 | 0.226569 | 0.520146 |
| 7 | 0.001103 | 0.022472 | 0.157766 | 0.449056 |
| 8 | 0.000282 | 0.009518 | 0.094187 | 0.332868 |
| 9 | 0.000079 | 0.004495 | 0.062964 | 0.276691 |
| 10 | 0.000020 | 0.001880 | 0.037421 | 0.204781 |
| 11 | 0.000005 | 0.000857 | 0.024350 | 0.166184 |
| 12 |  | 0.000354 | 0.014406 | 0.122801 |
| 13 |  |  | 0.009190 | 0.097994 |
| 14 |  |  | 0.005409 | 0.072269 |
| 15 |  |  | 0.003398 | 0.056970 |
| 16 |  |  | 0.001992 | 0.041964 |
| 17 |  |  |  | 0.032740 |
| 18 |  |  |  | 0.024077 |
| 19 |  |  |  | 0.018632 |
| 20 |  |  |  | 0.013680 |
| Total | 1.876828 | 3.108473 | 4.816915 | 7.074447 |

That is, if the comparison between the AMAC for M, which is transmitted to the recipient and the AMAC for M', which is generated by the recipient using the received message, shows that as the number of differences in the AMACs exceeds the expected amount, it is increasingly likely that the received message M' lacks sufficient integrity to be accepted. In this example, if $2^{10}$ differences are expected between the messages M and M', 2 bit differences (1.876828 rounded up) between their AMACs are within the expected range; if $2^{11}$ differences are expected between the messages M and M', 3 bit differences (i.e., 3.108473 rounded down) between their AMACs are within the expected range; and so on.

Figure 11:
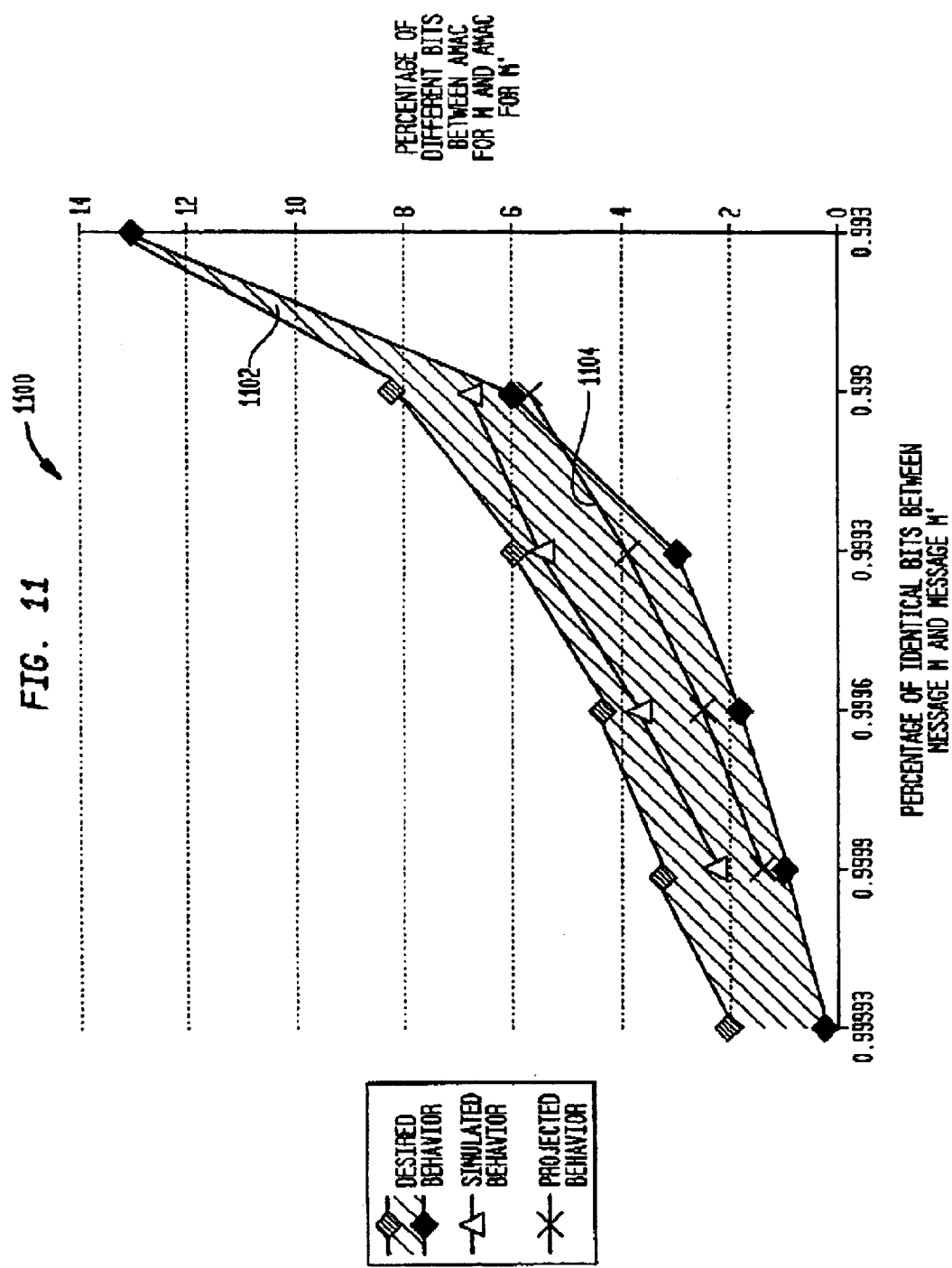
FIG. 11 is a graph illustrating the desired behavior, the predicted behavior, and the simulated behavior of an AMAC.

FIG. 11 is a graph illustrating the desired behavior, the predicted behavior as estimated above, and the simulated behavior of an AMAC according to the present invention. Note that, because the desired behavior may fall within an acceptable range, it is illustrated as a band. A working embodiment was programed using the C computer language. The desired behavior shows the number of differences in the AMACs increasing as the percentage of bit differences between M and M' increases.

Conclusion

Described are a method and device for providing absolute authentication for messages requiring only approximate integrity from the original. This is achieved by providing a probabilistic cryptographic checksum based on a shared key. Also described is a method for determining the expected number of differences between the AMAC for original message and the received message to conclude that the received message has sufficient integrity to accept it.

The above described embodiments of the invention are intended to be illustrative only. Numerous alternative embodiments may be devised by those skilled in the art without departing from the spirit and scope of the following claims.

I claim:

1. A method performed by a cryptographic device for generating an approximate authentication code, said method comprising the steps of:
   a. receiving a message containing data and arranging the data into a table having $|A|$ columns and $T^2$ rows, where A and T are integers and T is selected to be an odd integer;
   b. permuting at least some of the arranged data;
   c. masking the permuted data;

d. copying the permuted and masked data into T S-arrays, each S-array having |A| columns, and determining a majority bit value of each of the |A| columns for each of the T S-arrays;

e. using the determined majority bits to create a T-array having |A| columns and T rows; and f. determining the majority bit value of reach of the |A| columns in the T array.

2. The method of claim 1, further comprising the step of generating a pseudo-random bit string before the step of permuting.

3. The method of claim 2, wherein the step of generating the pseudo-random bit string (PRBS) further comprises using a shared key and pseudo-random number generator to generate the PRBS.

4. The method of claim 3, wherein the step of generating the PRBS further comprises using an initial value to generate the PRBS.

5. The method of claim 1, further comprising the step of selecting a length of |A|.

6. The method of claim 1, wherein the step of permuting comprises permuting the data by row.

7. The method of claim 6, further comprising the step of for each permuted row, permuting data within each row.

8. The method of claim 7, wherein the step of permuting data within each row further comprises the step of circularly shifting each permuted row a pseudo random number of places.

9. The method of claim 1, wherein the step of permuting further comprises permuting the data by bit.

10. The method of claim 1, wherein the step of permuting further comprises selecting an unpredictable permutation.

11. The method of claim 10, wherein the step of selecting an unpredictable permutation further comprises using one of a block cipher and a conventional message authentication code.

12. The method of claim 1, wherein the step of permuting comprises permuting all of the data in the message.

13. The method of claim 1, wherein the step of permuting comprises permuting less than all of the data in the message.

14. The method of claim 13, wherein the step of permuting further comprises using a pseudo-random function to select the data for permuting.

15. The method of claim 13, wherein the step of permuting comprises permuting a random sample of data in the message.

16. The method of claim 13, wherein the step of permuting further comprises permuting at least one of statistical data and averages of data in the message.

17. The method of claim 1, wherein the step of masking further comprises the step of stream encrypting the permuted data.

18. The method of claim 2, wherein the step of masking further comprises bitwise exclusive-ORing the permuted data and at least a portion of the pseudo-random bit string.

19. The method of claim 1, wherein the step of masking comprises generating an unbiased, independent, identically distributed set of 1 s and 0 s.

20. The method of claim 1, wherein the step of copying the permuted and masked data into S-arrays further comprises selecting each S-array to have T rows.

21. The method of claim 1, wherein the step of copying the permuted and masked data into S-arrays further comprises not selecting each S-array to have the same number of rows.

22. A method performed by a cryptography device for generating an approximate message authentication code, said method comprising the steps of:

a. receiving a message containing data and arranging the data into a table having |A| columns, and $T^2$ rows where A and T are integers;

b. permuting at least some of the arranged data;

c. masking the permuted data;

d. copying the permuted and masked data into T S-arrays each S-array having |A| columns, and determining a majority bit value of each of the |A| columns for each of the T S-arrays the step of copying the permuted and masked data into S-arrays further comprising selecting each S-array to have T rows and adding a row of pseudo-random bits to the S-array if T is an even number;

e. using the determined majority bits to create a T-array having |A| columns and T rows; and f. determining the majority bit value of each of the |A| columns in the T array.

23. A device for generating an approximate authentication code, comprising:

a. a pseudo-random string generator module configured to receive as input a secret key and to output a string of pseudo-random bits;

b. an arrangement module configured to receive a message containing data and arrange the data into a table having |A| columns and $T^2$ rows, where A and T are integers and T is an odd integer, c. a permuting module responsive to the arranged data and at least a portion of the string of pseudorandom bits and configured to permute arranged data;

d. a masking module responsive to the permuting module and at last a portion of the string of pseudorandom bits and configured to mask the permuted data; and e. a majority module responsive to the masking module and configured to:

i. copy the masked data into T S-arrays, each array having |A| columns and to determine the majority bit value of each of the |A| columns of the S-arrays;

ii. use the determined majority bits to create a T array having |A| columns and T rows; and iii. determine the majority bit value of each of the |A| columns in the T array.

24. The device of claim 23, wherein the pseudo-random bit string generator module further comprises a pseudorandom number generator.

25. The device of claim 24, wherein the pseudo-random number generator is a cryptographically secure random number generator.

26. The device of claim 23, wherein |A| is selected to have a predetermined length, the selected length depending on a sensitivity to bit changes.

27. The device of claim 23, wherein the permuting module is configured to permute the data by row.

28. The device of claim 27, wherein the permuting module is further configured, for each permuted row, to permute the data within each row.

29. The device of claim 28, wherein the permuting module is further configured to circularly shift each permuted row a pseudo-random number of places.

30. The device of claim 23, wherein the permuting module is configured to permute the data by one bit, byte, and data word.

31. The device of claim 23, wherein the permuting module is configured to use a collision-free, unpredictable permutation to permute the data.

32. The device of claim 23, wherein the permuting module is configured to permute all of the data in the message.

33. The device of claim 23, wherein the permuting module is configured to permute less than all of the data in the message.

34. The device of claim 33, wherein the permuting module uses a pseudorandom function to select the data for permuting.

35. The device of claim 33, wherein the permuting module is configured to permute a random sample of data in the message.

36. The device of claim 33, wherein the permuting module is configured to permute at least one of statistical data and averages of data in the message.

37. The device of claim 23, wherein the masking module further comprises an exclusive-OR circuit responsive to the permuting module and at least a portion of the string of pseudo-random bits.

38. The device of claim 23, wherein the majority module is configured to copy the masked data into S-arrays each having the same number of rows.

39. The device of claim 23, wherein the majority module is configured to copy the masked dam into S-arrays not all having the same number of rows.

40. A device for generating an approximate message authentication code, comprising:
   a. a pseudo-random bit string generator module configured to receive as input a secret key and to output a string of pseudo-random bits, the pseudo-random bit string generator module being further configured to receive as input an initial value;
   b. an arrangement module configured to receive a message containing data and arrange the data into a table having $|A|$ columns and $T^2$ rows, where A and T are integers;
   c. a permuting module responsive to the arranged data and at least a portion of the string of pseudo-random bits aid configured to permute the arranged data;
   d. a masking module responsive to the permuting module and at least a portion of the string of pseudo-random bits and configured to mask the permuted data; and
   e. a majority module responsive to the masking module and configured to;
      i. copy the masked data into T S-arrays, each array having and to determine the $|a|$ columns, e majority bit value of each of the $|A|$ columns for each of the DS-arrays;
      ii. use the determined majority bits to create a T-array having $|A|$ columns and T rows; and
      iii. determine the majority bit value of the of the $|A|$ columns in the T arrays; and
   wherein the pseudorandom string generator module is further configured to receive as input an initial value.

* * * * *